J. E. Boyle,
Waste Cock,
N° 17,074. Patented Apr. 21, 1857.
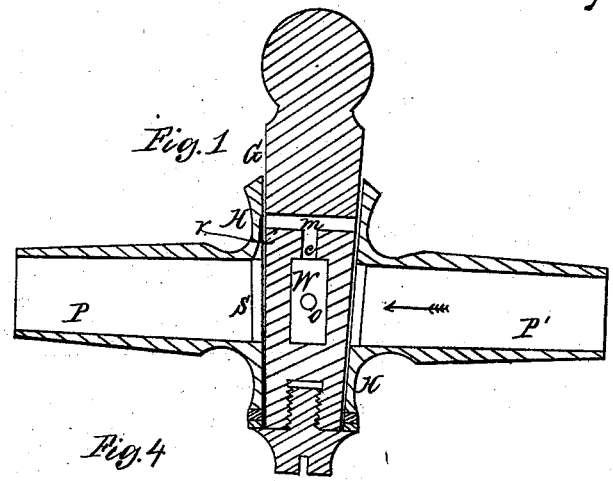
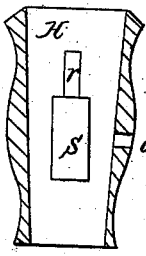
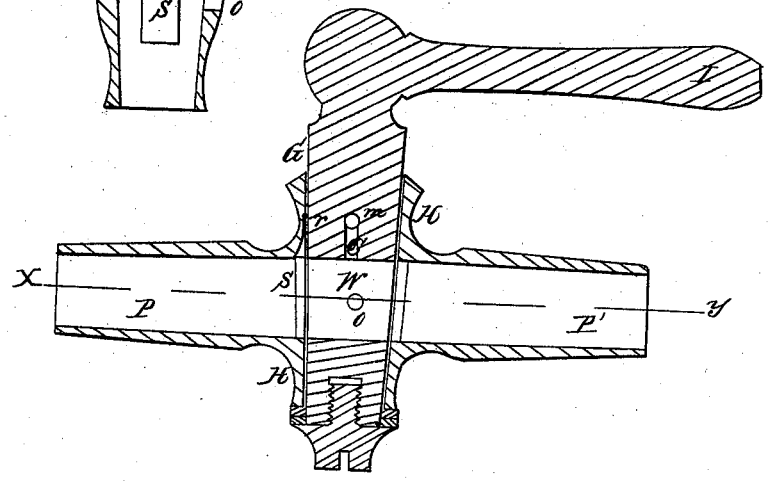
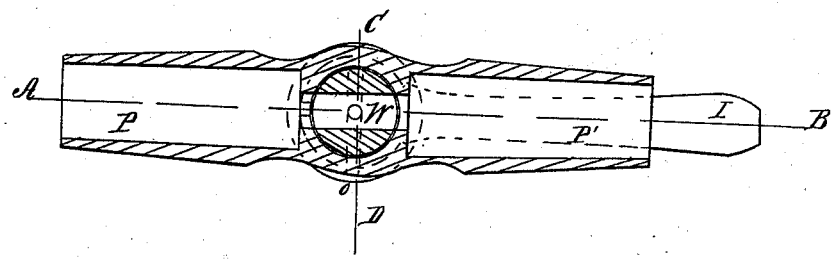

UNITED STATES PATENT OFFICE.

JAMES E. BOYLE, OF RICHMOND, VIRGINIA.

WASTEWAY IN FAUCETS.

Specification of Letters Patent No. 17,074, dated April 21, 1857.

*To all whom it may concern:*

Be it known that I, JAMES B. BOYLE, of Richmond, in the county of Henrico and State of Virginia, have invented certain new and useful Improvements in Stop and Waste Cocks; and I hereby declare that the following is a full, clear, and exact description thereof, reference being had to the accompanying drawing, in which—

Figures 1 and 2 represent cross sections of my improved stop and waste cock through A B on the axis-line of the pipe P and P'. Fig. 3 is a section through $x\ y$ of Fig 2 and Fig. 4 is a section of the band of the cock through the line C D of Fig. 3.

My improvement relates to stop cocks intended to establish or cut off at pleasure the communication between two branches of pipe and with the reservoirs they are connected with in such a manner, that the waste liquid shall not remain in the pipe, where it may cause injury by freezing or other causes.

I now proceed to the description of the construction and operation of my improved stop and waste cock.

G is a slightly conical plug fitting with gentle friction into a band H which is the junction of the two pipes P and P'; a passage or way $w$ passing diametrically through the plug establishes or cuts off the communication with the pipes at pleasure by turning the lever handle I at an angle of 90°. Fig. 2 shows the handle in a position when the liquid may flow freely from one pipe into the other.

In the center of the plug there is a small channel $c$ communicating with the passage or way $w$ and another channel $m$ in a plane parallel with that of the passage $w$, but inclined toward the latter at a right angle, so that when the cock is closed as shown in Fig. 1, the air of the channel $m$ will run parallel with the axis of the pipe.

The band H is of ordinary construction, with the exception of a small orifice $o$ passing through the body of the said band and is so placed in its central part as to face the way $w$ when the cock is stopped. And also a recess $v$ which is formed upon the inside of the band, being a continuation of the slot $s$ and is of such a length as to be flush with the channel $m$.

This stop cock is to be so constructed with the pipe branches, that the orifice $o$ shall be on the underside of the band. When the liquid is to be drawn from P' to P as shown by the arrow, the handle of the cock is to be turned parallel with the pipe;—when the flow is to be stopped the handle is at an angle of 90°. It will be perceived that in the latter position as shown in Fig. 1, the water or liquid remaining in the pipe P will flow out in passing into the recess $r$ through channel $m$ and $c$, finally through the way $w$ and orifice $o$ into a reservoir that is placed there for collection of the waste.

Having fully described my improvement what I claim as my invention and desire to secure by Letters Patent is—

The recess $r$ and orifice $o$ in combination with the channels $m$ and $c$, when constructed and arranged in relation to the ordinary component parts of stop cock in the manner herein specified.

In testimony whereof I have signed my name to this specification before two subscribing witnesses.

JAMES E. BOYLE.

Witnesses:
D. HAGERTY,
JAS. R. ALLEN.